United States Patent

Ouyang et al.

[11] Patent Number: 5,908,892
[45] Date of Patent: Jun. 1, 1999

[54] N, N-ALKYL POLYACRYLAMIDE METAL TREATMENT

[75] Inventors: Jiangbo Ouyang, Flemington, N.J.; Jen-Chi Chen, Morrisville, Pa.

[73] Assignee: BetzDearborn Inc., Trevose, Pa.

[21] Appl. No.: 08/932,137

[22] Filed: Sep. 16, 1997

[51] Int. Cl.$^6$ .................................................. C08L 39/00
[52] U.S. Cl. ............................................................ 524/555
[58] Field of Search .............................................. 524/555

[56] References Cited

U.S. PATENT DOCUMENTS

| | | | |
|---|---|---|---|
| 3,076,771 | 2/1963 | Coover, Jr. | 524/555 |
| 3,082,178 | 3/1963 | Coover, Jr. | 524/555 |
| 3,984,507 | 10/1976 | Miller | 524/555 |
| 4,067,839 | 1/1978 | Schultz | 524/555 |
| 4,074,039 | 2/1978 | Lim | 524/555 |
| 4,170,672 | 10/1979 | Moriya et al. | 524/555 |
| 4,254,249 | 3/1981 | Cottrell et al. | 524/555 |
| 4,543,371 | 9/1985 | Gallop et al. | 524/555 |
| 5,401,333 | 3/1995 | Ouyang et al. | 148/241 |
| 5,412,011 | 5/1995 | Morris et al. | 524/261 |
| 5,451,270 | 9/1995 | Ouyang et al. | 148/241 |
| 5,518,555 | 5/1996 | Ouyang et al. | 148/251 |

FOREIGN PATENT DOCUMENTS

| | | | |
|---|---|---|---|
| 0359349 | 3/1990 | European Pat. Off. | 524/555 |
| 1088109 | 10/1967 | United Kingdom | 524/555 |

*Primary Examiner*—Bernard Lipman
*Assistant Examiner*—N. Sarofim
*Attorney, Agent, or Firm*—Steven D. Boyd

[57] ABSTRACT

An anionic polyacrylamide pretreatment for a metal surface which enhances corrosion resistance and surface adhesion properties is described. The pretreatment is stable at extreme pH's and compatible with other water soluble polymers. The anionic polyacrylamide includes mono- or di-alkyl substitutions on the N group of the polyacrylamide.

2 Claims, No Drawings

N, N-ALKYL POLYACRYLAMIDE METAL TREATMENT

FIELD OF THE INVENTION

The present invention relates to a coating for metals which improves the corrosion resistance and adhesion properties of the metal surface. More particularly, the present invention relates to a stable, polyacrylamide treatment which is effective on many metal surfaces such as aluminum, zinc, galvanized steel, and aluminum-zinc galvanized steel.

BACKGROUND OF THE INVENTION

The purposes of conversion coatings on metal surfaces are to provide corrosion resistance and improve the adhesion of coatings. The conversion coating improves the adhesion of coating layers such as paints, inks, lacquers, and plastics. Traditionally, chromates have been utilized as conversion coating compounds. Chromates are known to exhibit acceptable performance on different types of metals or alloys, such as aluminum, steel, galvanized steel, and zinc-aluminum coated steel. Chromate conversion coatings are typically administered by contacting the metal surface with an aqueous solution containing hexavalent or trivalent chromium ions. Concerns have been raised regarding the pollution effect of chromate discharge into rivers or water ways by such processes. Due to the high solubility and the strongly oxidizing character of hexavalent chromium ions, conventional chromate conversion coating processes require extensive waste treatment procedures to control their discharge.

Attempts have been made to produce acceptable chromate-free conversion coatings. Chromate-free conversion coatings based upon complex fluoroacids and heavy metals are known in the art. However, they have not enjoyed wide spread commercial acceptance.

The use of non-chrome conversion coatings, based upon anionic polyacrylamide copolymers are known in the art. U.S. Pat. No. 5,412,011 discloses a nonchrome pretreatment for metallic surfaces which comprises anionic polyacrylamide copolymers, inorganic silicates and organo functional silanes. U.S. Pat. No. 5,518,555 discloses a metal pretreatment which is essentially free of silicate, chromium, fluoride and heavy metals which comprises an aqueous solution of anionic polyacrylamide.

While nonchrome conversion coatings which include anionic polyacrylamide provide effective pretreatment, they do exhibit limitations. The anionic polyacrylamides exhibit instability at extreme pH's. Also, anionic polyacrylamide pretreatments have been found to be incompatible with other water soluble polymers, such as polyvinyl alcohol which may be present in conversion coating treatments.

SUMMARY OF THE INVENTION

The present inventors have discovered that anionic polyacrylamide pretreatment which are stable, even at extreme pH's, and compatible with other water soluble polymers can be formed by providing alkyl substitutions on the N group of the polyacrylamide. It was found that N-substituted polyacrylamide conversion coating treatments were stable, even at extreme pH's, and were compatible with other water soluble polymers, such as polyvinyl alcohol.

DETAILED DESCRIPTION OF THE INVENTION

It was discovered by the present inventors that N-substituted anionic polyacrylamide copolymers enhance corrosion resistance and surface adhesion properties of zinc coated steel (galvanized steel), aluminum, and zinc aluminum coated steel (Galvalume available from Bethlehem Steel Corporation). The N-substituted anionic polyacrylamide copolymers of the present invention exhibit stability at extreme pH's and in the presence of other water soluble polymers such as polyvinyl alcohol. The pretreatment of the present invention can be dried in place or rinsed after application and provides enhanced corrosion resistance and adhesion properties.

The present invention will be described with respect to the treatment of metals such as aluminum and alloys thereof, and galvanized (zinc-coated) steel. The metal treatment of the present invention also has applicability for other metals such as Galvalume® (a zinc aluminum galvanized steel available from Bethlehem Steel Corporation), and cold rolled steel. As used herein, chrome-free and substantially chrome-free indicate that chrome is not intentionally added to a treatment, however, trace amounts may be present.

The treatment solution of the present invention includes anionic N-substituted polyacrylamide homopolymers and copolymers in an aqueous solution. The anionic N-substituted polyacrylamide polymers of the present invention contain monomeric repeat units comprising from about 10% to 100% acrylamide. The copolymer of the present invention can have an acrylate to acrylamide molar ratio from about about 10:1 up to 100% acrylamide and a weight average molecular weight of about 200 to 500,000. Preferably the copolymers will have a molar ratio of from about 1:1 to about 9:1 and a number average molecular weight of from about 2,000 to 350,000. The mono or di-substitutions on the N atoms of the amide group are alkyl groups of from 1 to 8 carbon atoms. The alkyl group can be straight-chained or branched. The preferred alkyl groups have from 1 to 4 carbon atoms. Both mono and di-substituted materials are effective.

An aqueous concentrate of N-substituted anionic polyacrylamide may be prepared which upon dilution to about 1% to 10% gives aqueous solutions with the appropriate concentration. Such a concentration is from about 0.05% to about 2% of the N-substituted polyacrylamide. The treatment solution of the present invention is effective at pH's of from about 1.5 to about 6.5 with a preferred treatment ranges being from about pH 2 to about pH 4.

A typical application process includes: cleaning the metal surface with an alkaline cleaner, followed by a tap water rinse, squeegeeing and applying the N-substituted polyacrylamide treatment at room temperature. The treatment solution of the present invention may be applied by any suitable method, including but not limited to spraying, dip squeegee, flow coating, roll coating and the like.

The N-substituted anionic polyacrylamide of the present invention has the general formula:

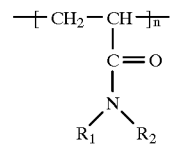

where $R_1$ and $R_2$ are the same or different and are H or $C_1$–$C_{18}$ straight or branched alkyl with the proviso that $R_1$ and $R_2$ are not both H N=2–850.

The N-substituted polyacrylamide of the present invention may be employed alone or in combination with known conversion coating components such as fluoroacids, silanes and other water soluble polymers.

EXAMPLES

The present invention will not be further described with reference to a number of specific examples which are to be regarded solely as illustrative and not as restricting the scope of the present invention. In these examples, the effectiveness of the treatment solution of the present invention was evaluated with a variety of tests familiar to those skilled in the art. These included: "T-bend", the tendency for paint to disadhere from a 180 degree bend in the metal (zero T equals perfect); "Reverse Impact", the tendency for paint to disadhere from a reverse impacted metal surface; "T-bend/boiling deionized water", the tendency for paint to crack and flower at a 180 degree bend in the metal after exposure to boiling deionized water for twenty minutes (no cracking or flowering is considered a pass); "Neutral Salt Spray", treated panels are placed in a neutral salt spray chamber (per ASTMB 117) and corrosion process is monitored by determining the paint loss along the scribed area and blister formation.

N, N-alkyl polyacrylamide for use in the following examples was prepared through a radical initiation reaction using redox couples as initiators. An exemplary process is as follows: charge 70.0 grams of deionized water to a reaction flask, add redox couple consisting of a reducing agent (0.59 grams isoascorbic acid in 3.3 grams of diionized water) and an oxidizing agent (0.39 grams of 70% t-butyl hydroperoxide in 3.0 grams of deionized water) separately to the flask at 60° C. monomer solution containing N, N-dimethylacrylamide was also added in a three hour period, at the conclusion of addition, polymerization was continued for three hours. The structure of the end material N, N-dimethylpolyacrylamide, was verified by C13 NMR. The polymer solution had a Brookfield viscosity of 147 CPS at 13.4% solids (25° C.), The N,N-dimethylpolyacrylamide as prepared above was used to formulate a variety of metal pretreatment formulations as set out in Table I. In order to assess the stability of the formulations, formulations were also prepared which substituted anionic polyacrylamide for the N,N-dimethylpolyacrylamide. While the N,N-dimethylpolyacrylamide formulations remained clear and stable, the anionic polyacrylamide-based formulations were milky solutions containing precipitates.

TABLE I

| Treatment | Composition |
|---|---|
| 1. | A commercial chrome-based pretreatment available from BetzDearborn Inc. as PT 1500 |
| 2. | A commercial polyacrylamide pretreatment available from BetzDearborn Inc. as DC-4360 with $H_2ZrF_6$ used to adjust pH to 3.8 |
| 3. | 1.5% N-isopropylpolyacrylamide + 0.8% $H_2TiF_6$ + 0.1% epoxy silane |
| 4. | 1.5% N, N-dimethylpolyacrylamide + 0.8% $H_2TiF_6$ + 0.1% epoxy silane |

Example 1

ACT G60 hot dipped galvanized steel was treated with the treatment solutions described above. The treated galvanized panels were painted with an Akzo polyester paint and a Sherwin Williams polyvinyl chloride paint. The panels were prepared as follow: cleaned with 3% BetzDearborn Clean 4010 (an alkaline cleaner); rinsed with ambient tape water; squeezgeed; treatment solutions spin applied. The panels were then painted according to the manufacturer's paint specifications.

Tables II and III summarize the results of adhesion and accelerated corrosion testing.

TABLE II

AZKO PAINT PERFORMANCE

| ID | T-Bend | NSS (500 H) SCRIBE | NSS (500 H) FIELD | NSS (750 H) SCRIBE | NSS (750 H) FIELD |
|---|---|---|---|---|---|
| 1 | 0.5T | 6.5 | 9.5 | 6 | 10 |
| 2 | 0.5T | 8 | 10 | 5.5 | 10 |
| 3 | 2T | 7 | 10 | 6 | 10 |
| 4 | 1T | 6 | 10 | 6 | 10 |

All panels passed reverse impact at 120 obs. and 50+ MEK rubs

TABLE III

SHERWIN WILLIAMS PAINT PERFORMANCE

| ID | T-Bend | NSS (500 H) SCRIBE | NSS (500 H) FIELD | NSS (750 H) SCRIBE | NSS (750 H) FIELD |
|---|---|---|---|---|---|
| 1 | OT | 7 | 10 | 4 | 10 |
| 2 | OT | 5 | 10 | 4 | 10 |
| 3 | OT | 7 | 10 | 5.5 | 10 |
| 4 | OT | 6 | 10 | 6 | 10 |

Example 2

Metal treatments were applied to ACT G60 hot dipped galvanized panels which were carried through a foil-line to simulate a coil-coating line. The treatment consisted of cleaning with BetzDearborn Kleen™ 4010 (an alkaline cleaner), a tap water rinse, a second tap water rinse, and a roll coater followed by oven drying. Treated panels were painted with Lilly PVDF and Sherwin Williams polyvinyl chloride two coat paints and cured according to manufacturer's specifications.

Tables IV and V summarize the adhesion and accelerated corrosion test results.

TABLE IV

LILLY PAINT PERFORMANCE

| ID | T-Bend | NSS (500 H) SCRIBE | NSS (500 H) FIELD | NSS (750 H) SCRIBE | NSS (750 H) FIELD |
|---|---|---|---|---|---|
| 1 | 2.5T | 4.5 | 8 | 4 | 7 |
| 2 | 3T | 5 | 8 | 3 | 6 |
| 3 | 3T | 5 | 9 | 3 | 8 |
| 4 | 1.5T | 5 | 8 | 3 | 7.5 |

All panels passed reverse impact at 120 "# and 100+ MEK rubs.

TABLE V

SHERWIN WILLIAMS PAINT PERFORMANCE

| ID | T-Bend | NSS (500 H) SCRIBE | NSS (500 H) FIELD | NSS (750 H) SCRIBE | NSS (750 H) FIELD |
|---|---|---|---|---|---|
| 1 | OT | 6 | 10 | 4 | 10 |
| 2 | OT | 5 | 10 | 4 | 10 |

TABLE V-continued

SHERWIN WILLIAMS PAINT PERFORMANCE

| ID | T-Bend | NSS (500 H) SCRIBE | NSS (500 H) FIELD | NSS (750 H) SCRIBE | NSS (750 H) FIELD |
|----|--------|--------------------|--------------------|--------------------|--------------------|
| 3  | OT     | 5                  | 10                 | 4                  | 10                 |
| 4  | OT     | 4                  | 10                 | 3                  | 10                 |

The test results show that N, N-alkylpolyacrylamide metal treatments provided adhesion and corrosion properties comparable to commercial anionic polyacrylamide and chrome-based treatments, while providing enhanced extreme pH stability and compatibility with water soluble polymers often found in aqueous metal treatment compositions.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method of forming a conversion coating on a metal surface comprising contacting the metal surface with an aqueous solution comprising an N, N-substituted polyacrylamide of the general formula:

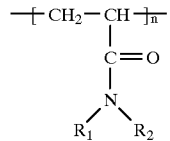

where $R_1$ and $R_2$ are the same or different and are H or a $C_1$–$C_8$ branched or linear alkyl group with the proviso that $R_1$ and $R_2$ are not both H N=2–850.

2. The aqueous solution of claim 1 wherein said N, N-substituted polyacrylamide has a weight average molecular weight of from about 200 to about 500,000.

* * * * *